United States Patent [19]

Tickins

[11] 4,325,661
[45] Apr. 20, 1982

[54] DRILL BIT END PROTECTORS

[76] Inventor: Jack J. Tickins, R.R. 3, Caledon East, Ontario, Canada

[21] Appl. No.: 48,705

[22] Filed: Jun. 15, 1979

[51] Int. Cl.³ .................. B23B 31/10; B23B 39/00; B23B 5/22
[52] U.S. Cl. .................. 408/239 A; 408/241 R; 279/1 A; 279/1 S
[58] Field of Search .............. 408/238, 239, 241 R, 408/241 G, 241 S, 226; 279/1 R, 1 A, 1 S, 1 ME, 55, 102, 103

[56] References Cited

U.S. PATENT DOCUMENTS

| 1,079,520 | 11/1913 | Shreve | 279/1 S |
| 1,964,030 | 6/1934 | Brush | 408/226 |
| 3,041,078 | 6/1962 | Lawall et al. | 279/1 S |
| 3,136,561 | 6/1964 | McAuliffe et al. | 408/239 |

Primary Examiner—Harrison L. Hinson

[57] ABSTRACT

A cutting end protector is used in securing one of the cutting ends of a double ended drill bit in a drill chuck. The cutting end protector comprises a body portion contoured to mate with the inner surface of the drill chuck and adapted to receive the drill chuck pin. The body portion has a cutting end receiving face provided with a central recess for receiving the point of the cutting end and a pair of chamfered face portions diverging outwardly and forwardly from the body portion, one on either side of the central recess. The chamfered face portions are slanted in opposing directions for fitting flushly with the cutting edge trailing surfaces of the cutting end.

6 Claims, 8 Drawing Figures

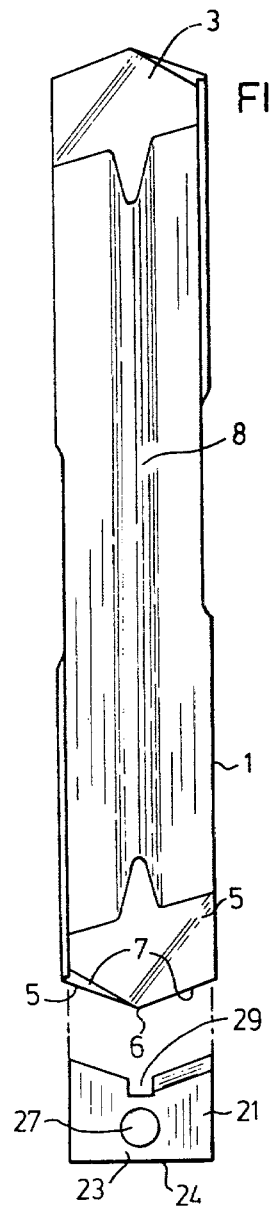
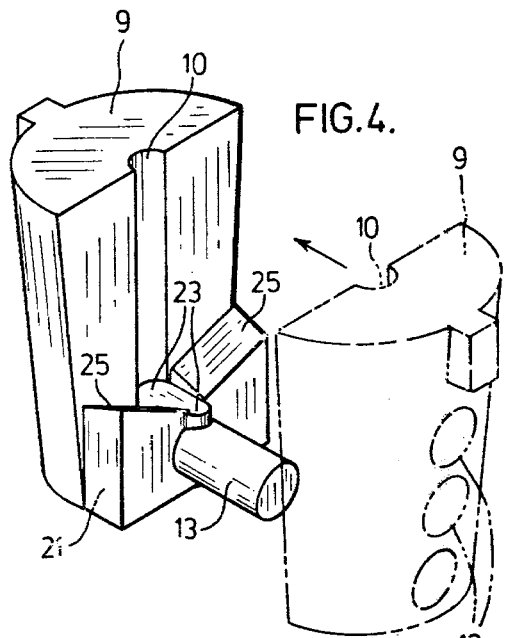
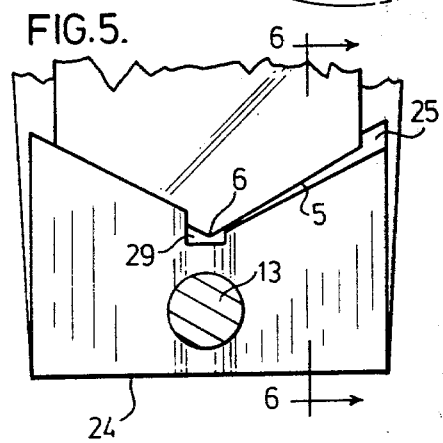
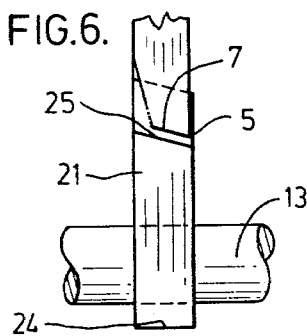
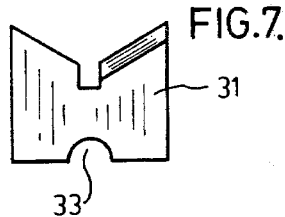

DRILL BIT END PROTECTORS

FIELD OF THE INVENTION

The present invention relates to a protector for use in securing a double ended drill bit in a drill chuck.

BACKGROUND OF THE INVENTION

Conventional drill bits are used on a daily basis for performing almost a limitless number of drilling operations. An example of one particular operation is the drilling of railway track sections to receive bolts for securing the sections to one another in an end to end manner. The drill bit is secured in an appropriate drill with the cutting end exposed for the drilling operation. However, after numerous uses, the cutting end becomes quite dull and either has to be resharpened or discarded, thereby necessitating the use of a new drill bit. The sharpening and/or replacement of the drill bit is both time consuming and costly.

Suggestions have been made in the past to provide drill bits which are double ended, i.e. drill bits which have a cutting edge at both ends. The provision of a double ended cutting bit would appear to be extremely beneficial in that they are only slightly more costly than the single ended drill bit and they require sharpening or replacement only half as often as a conventional drill bit.

Even in view of the fact that the double ended drill bit has extremely desirable characteristics, it has met with very limited success because a double ended drill bit can not be properly secured in a drill chuck. The secured cutting end rides on the chuck pin which not only cuts into and damages the pin but also dulls the cutting edges of the bit, thereby rendering them ineffective when the bit is reversed. Therefore, according to conventional practice, the provision of the second cutting end on the bit is more of a hindrance than a help. The problem is augmented by the fact that all the drilling pressures further tend to drive the bit into the chuck pin.

The present invention provides an answer to these problems in the form of a cutting end protector for use in securing a double ended drill bit in a drill chuck. As a result, the economic and other benefits of a double ended drill bit can be reaped without any concern for the drill.

The cutting end protector of the present invention comprises a body portion adapted to fit in the drill chuck and located therein by a chuck pin. The body portion has a cutting end receiving face provided with a central recess for receiving the point of a bit cutting end and a pair of chamfered or bevelled face portions diverging outwardly and forwardly, of the body portion one on either side of the central recess. The chamfered face portions are slanted in opposing directions for fitting with the cutting edge trailing surfaces, so that the cutting edges are neither dulled or come into contact with the drill chuck pin.

BRIEF DISCUSSION OF THE DRAWINGS

The above, as well as further features of the present invention will be described in greater detail according to the preferred embodiments of the present invention wherein;

FIG. 3 is a top view of a double ended drill bit and a cutting end protector according to a preferred aspect of the present invention;

FIG. 4 is a perspective view looking down on a conventional drill chuck with the cutting end protector of FIG. 3 located by a drill chuck pin;

FIG. 5 is a section taken through a drill chuck with the double ended drill bit of FIG. 3 secured in position against the cutting end protector;

FIG. 6 is a section taken along the lines of 6—6 of FIG. 5;

FIG. 7 is a top view of an alternate form of a cutting end protector according to the present invention and;

Figure 1:
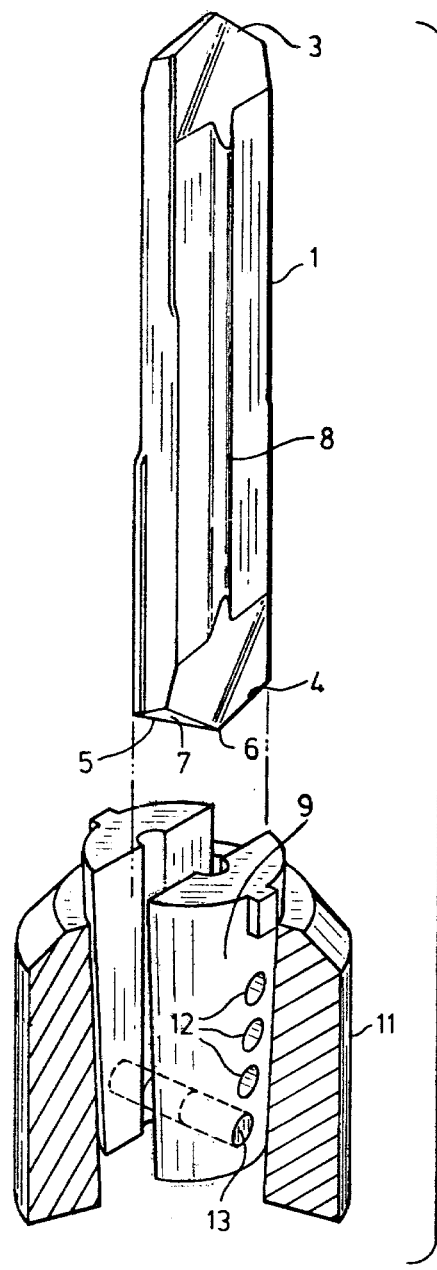
FIGS. 1 and 2 show respectively an exploded partial section perspective view and an assembled sectional view of the prior art arrangements.
Figure 8:
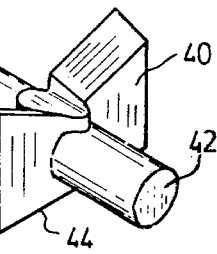
Figure 2:
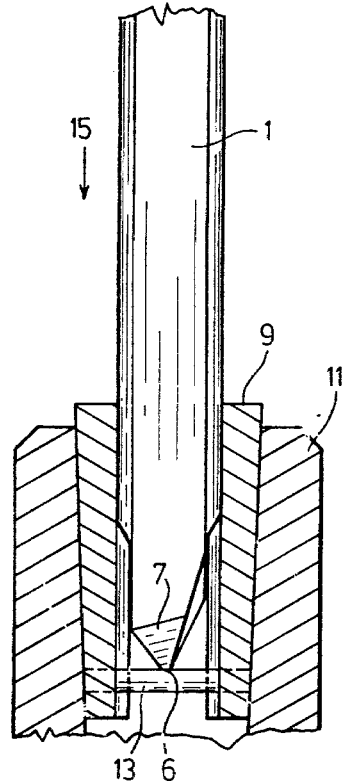

FIG. 8 on the same page of drawings as FIGS. 1 and 2, shows a perspective view of an alternate preferred form of the present invention.

DETAILED DESCRIPTION ACCORDING TO PREFERRED EMBODIMENTS

Referring first to the prior art arrangements of FIGS. 1 and 2, a double ended drill bit indicated at 1, includes cutting ends 3 and 4, one at each end of the bit. Cutting end 3 remains exposed for drilling while cutting end 4 is secured in the drill chuck. These cutting ends are identical and each includes a pair of cutting edges, one of which is indicated at 5 on cutting end 4, a point or tip is indicated at 6 and a pair of trailing surfaces 7 immediately rearward of the cutting edges. The drill chuck itself includes an inner assembly 9, an outer rotatable shell 11 and a chuck pin 13. Shell 9 is provided with a plurality of chuck receiving apertures 12. The chuck pin is moveable from aperture to aperture and is positioned according the length of bit desired to be exposed. For example, a new bit is longer than a used sharpened bit from which material is removed during sharpening. Therefore, the pin will be at the most rearward position for use with a new bit and moved forward as the bit length decreases with use and resharpening.

Referring strictly to FIG. 2, it will be seen that according to conventional arrangements, when the drill bit 1 is secured in the drill chuck, point 6 rides directly on chuck pin 13. Furthermore, the chuck pin is the only thing other than the frictional fit preventing further downward or rearward movement of the drill bit. This is of particular importance when considering the fact that during the drilling operation, all of the thrust exerted on the drill bit is in the direction of arrow 15 which attempts to force the bit through the pin. This causes a wearing action on both point 6 and pin 13. In cases where one is made from harder material than the other, both will wear and severe damage can be done in particular to the softer material component. For example, the drill bit may be made of hardened tempered steel and completely sever the softer chuck pin while at the same time dulling the cutting point of the bit.

In some applications the chuck may include spacers for locating the bit end away from the chuck pin. However, again with these applications both the cutting point and the cutting edges ride directly on the spacer, dulling them both and rendering them unsuitable for proper drilling.

Turning now to FIGS. 3 and 8, it becomes readily apparent that the cutting end protector of the present invention completely adapts a conventional drill chuck for use with a double ended drill bit. The same double ended bit 1, is again, secured in chuck 9 but without causing any damage to either the secured cutting end of the bit or the chuck pin.

The cutting end protector of FIGS. 3 through 6 comprises a body portion 21 and a cutting end receiving face consisting of central recess 29 and chamfered or bevelled face portions 25. As will be seen in the drawings, each of these face portions diverges outwardly from the central recess, forwardly of the body portion. The body portion itself is provided with an aperture 27 for receiving the chuck pin 13 as well as body protrusions or beads 23 on either side of the protector, contouring the protector to the inner shape or surface of the chuck 9.

As best shown in FIG. 4, the protector is inserted in a conventional chuck by disassembling the chuck and fitting the chuck pin through aperture 27. The chuck is then reassembled to secure the protector in place.

In the case of a protector as shown in FIG. 7, the chuck need not be disassembled and protector 31 is simply slid down the open end of the chuck until the chuck pin is fitted into grooved portion 33 of protector 31.

FIG. 8 shows a somewhat different arrangement again. According to this embodiment the cutting end protector comprises a body portion 40 provided with an integral chuck pin 42. As mentioned above, the chuck pins are moveable within the drill chuck for the desired bit exposure. However, when working in the field it is often easy to lose a chuck pin when disassembling the chuck to move the pin. According to the arrangement shown in FIG. 8, this does not present a problem because the chuck pin is actually part of the cutting end protector so that both the pin and the protector are moved as a single unit.

After the protector has been installed in the chuck, the double ended bit is then fitted through the open end of the chuck and forced into contact with the protector. As is best shown in FIG. 5, the central point of the cutting end is received in central recess 29 of the cutting end receiving face. Furthermore, as shown in FIG. 6, the chamfered surfaces 25 fit flushly with trailing surfaces 7 immediately rearward of cutting edges 5, to both prevent the central point from coming into contact with the protector and at the same time to prevent the cutting edge from being dulled.

It should be noted that the connector is made such that it is slightly thinner than the drill bit itself, so that the chuck can be fully tightened to properly secure the drill bit in place.

During the drilling operations, forces are again directed on the bit, attempting to force it further into the chuck, however, the flush fit between the cutting edge trailing surfaces and chamfered surfaces 25 of the protector prevent any longitudinal movement of the bit thereby eliminating essentially all of the wear and tear on the secured cutting end of the drill bit, the protector and the drill chuck pin. The protector may additionally be made from the same material as the drill bit, i.e. hardened tempered steel. The provision of beads 8, one on either side of the bit secured in grooves 10 of the chuck itself, prevents any sideways movement of the bit so that it is fully secured in the chuck. Once the cutting end 3 becomes dulled to the extent that it no longer provides an effective cut for the drilling operation, one need only to release the tension on the chuck, remove and reverse the drill bit so that cutting end 3 is secured in the chuck and retighten the chuck. Cutting end 4 is now presented for continued drilling and due to the provision of the cutting end protector has a pair of keen cutting edges, as well as its original sharp cutting point. Furthermore, chuck pin 13 remains undamaged, even though one of the cutting ends of the bit has been secured in the chuck.

A further feature of the present invention is the provision of a flat surface on the end of the body portion opposite the cutting end receiving face according to the embodiments of FIGS. 3 through 6 and 8. These are indicated at 24 and 44 respectively. As a result of this feature, both of these protectors are useable not only with a double ended cutting bit but also with a single ended cutting bit by merely reversing the protector so that the flat surface is presented to the secured end of the bit. The protector in the reversed position is again located by the chuck pin whether it be part of the drill chuck or an integral part of the protector.

The embodiments of the drawings show the protector as being contoured to conform to the inner surface of the drill chuck and more specifically, to include side beads. However, the protector need only be flat sided to fit in the drill chuck. Without the beads the protector is still self centering when the bit end is inserted in the chuck due to the fact that it fits to the bit end.

Although various preferred embodiments of the invention have been described herein in detail, it will be apparent to one skilled in the art that variations may be made thereto, without departing from the spirit of the invention or the scope of the appended claims.

The embodiments of the invention in which an exclusive property or privilege is claimed are defined as follows:

1. A cutting end protector adapted to be clampingly engaged in a drill chuck for receiving a cutting end of a double ended flattened track bit in which the cutting end consists of a pair of cutting edges bordered by trailing surfaces and meeting at a cutting point, said cutting end protector comprising a thin, flat body portion which is apertured to receive a chuck pin for locating and restricting movement of the protector and which is provided with a cutting end receiving face having a central recess for receiving the cutting point of the cutting end and a pair of aligned chamfered face portions diverging outwardly and forwardly of the body portion, one on either side of the central recess, said chamfered face portions being slanted in opposing directions for fitting flushly with the cutting edge trailing surfaces.

2. A cutting end protector as defined in claim 1, wherein said body portion is provided on each side with an outwardly extending bead.

3. A cutting end protector as defined in claim 1, including a flat face for receiving a flat end of a single ended bit on the opposite side of said body portion from said cutting end receiving face.

4. A track bit end receiver adapted to fit into a drill chuck for receiving a cutting end of a flattened track bit in which the cutting end consists of a pair of cutting edges bordered by trailing surfaces and meeting at a cutting point, said end receiver comprising a thin, flat body portion provided with pin means forming a chuck pin for locating and restricting movement of the receiver and which is provided with a cutting end receiving face having a central recess for receiving the cutting end point and a pair of aligned chamfered face portions diverging outwardly and forwardly of the body portion, one on either side of the central recess, said chamfered face portions being slanted in opposing directions for fitting flushly with the cutting edge trailing surfaces.

5. A track bit end receiver as claimed in claim 4 including a flat face for receiving a flat end of a single ended track bit on the opposite end of said body portion from said cutting end receiving face.

6. A drill chuck arrangement adapted to receive a cutting end of a flattened track bit, said drill chuck arrangement comprising a drill chuck adjustable on a chuck pin and a cutting end protector which is located in position within the drill chuck by the chuck pin, the end protector being flattened to mate with the drill chuck and being provided with a cutting end receiving face having a central recess for receiving a cutting end point and a pair of aligned chamfered face portions diverging outwardly and forwardly of the body portion one on either side of the recess slanted in opposing directions for fitting flushly with cutting edge trailing surfaces on the cutting end of the track bit.

* * * * *